United States Patent [19]

Crabtree

[11] Patent Number: 4,763,883
[45] Date of Patent: Aug. 16, 1988

[54] AIRSPRING AND SLEEVE

[75] Inventor: Michael L. Crabtree, Arvada, Colo.

[73] Assignee: The Gates Rubber Company, Denver, Colo.

[21] Appl. No.: 32,212

[22] Filed: Mar. 30, 1987

[51] Int. Cl.[4] .............................. F16F 9/04; F16J 3/00; B65M 81/00; B29D 28/00

[52] U.S. Cl. .................................. 267/64.27; 156/175; 92/103 R; 264/103; 267/64.24

[58] Field of Search ................. 267/35, 113, 148, 149, 267/217–220, 64.11, 64.15, 64.19, 64.23, 64.24, 64.26, 64.27, 64.28; 280/711, 714; 92/34, 36, 47, 93, 103 R, 103 F; 264/103; 188/298; 156/169, 173, 175, 177

[56] References Cited

U.S. PATENT DOCUMENTS

| | | | |
|---|---|---|---|
| 1,460,949 | 7/1923 | Currier | 156/169 |
| 2,257,913 | 10/1941 | Maranville | 267/35 X |
| 2,980,571 | 4/1961 | Mosshart et al. | 267/64.27 X |
| 3,319,952 | 5/1967 | Travers | 267/64.27 |
| 3,403,603 | 10/1968 | Turner | 92/103 R X |
| 3,666,598 | 5/1972 | Christie et al. | 156/361 |
| 3,897,941 | 8/1975 | Hirtreiter et al. | 267/64.24 |
| 3,970,495 | 7/1976 | Ashton et al. | 156/175 X |
| 3,992,239 | 11/1976 | Schroeder | 152/556 |
| 4,118,262 | 10/1978 | Abbott | 156/175 |
| 4,174,827 | 11/1979 | Hirtreiter et al. | 267/64.27 |
| 4,629,170 | 12/1986 | Warmuth | 267/64.27 |

FOREIGN PATENT DOCUMENTS

| | | |
|---|---|---|
| 1125319 | 6/1982 | Canada . |
| 2905791 | 8/1980 | Fed. Rep. of Germany ... 267/64.24 |
| 0181620 | 10/1983 | Japan .................................. 264/103 |

*Primary Examiner*—Andres Kashnikow
*Assistant Examiner*—Robert J. Oberleitner
*Attorney, Agent, or Firm*—H. W. Oberg, Jr.; C. H. Castleman, Jr.

[57] ABSTRACT

An airspring sleeve and airspring that each have a chamber portion and rolling lobe portion reinforced with successive layers of embedded cord where cord in one layer is wound at opposite helical angles from cord of a second successive layer and where the cord is wound at inconstant helical angles in an annular band portion of least one of the sleeve portions.

25 Claims, 5 Drawing Sheets

AIRSPRING AND SLEEVE

BACKGROUND OF THE INVENTION

The invention relates to compressable fluid type spring devices for vehicles, but more particularly, the invention relates to airsprings of the type with a flexible type rubber sleeve with a rolling lobe portion.

Rolling lobe type airsprings are well known in the art and are made with a sleeve having a chamber portion connected to a closure member and an inverted rolling lobe portion connected to a piston that partially reciprocates in the chamber portion of the sleeve. The general formula for calculating spring rate of such an airspring is well known and documented such as in U.S. Pat. No. 4,629,170. In general, the spring rate of a conventional airspring can be represented by the following equation:

$$K = \frac{nPA_e^2}{V} + \frac{PgdA_e}{dH}$$

where:
 K=spring stiffness
 P=absolute internal pressure
 Pg=gauge pressure
 $A_e$=effective area acted on by air pressure
 V=air volume
 n=ratio specific heats for air
 $dA_e/dH$=change in effective area with spring height An airspring is a load support member that utilizes the compressable characteristics of air for a springing effect. From the foregoing equation it is seen that spring rate may be changed by altering the pressure in the airspring, but the corresponding change in spring rate also changes the load carrying capability of the airspring. Another conventional manner for changing the spring rate of an airspring is to change the effective area that is acted on by the internal pressure of the spring. This is done by altering the external shape of the piston which laterally supports part of the rolling lobe portion of the sleeve. There is no change in effective area or spring rate if the piston is straight sided or cylindrical. However, a reduced effective area is achieved by a frustoconically shaped piston that reduces in size as it enters the chamber portion; and an increase in spring rate is achieved by a frustoconically shaped piston whose effective area increases as it enters the chamber portion.

Another method for changing the effective spring rate of an airspring is to increase its volume by increasing the inflated cylindrical diameter of the sleeve portion or to increase the inflated cylindrical length of the sleeve; both methods substantially affect the space envelope of the airspring. An increase in the inflated diameter also has the effect of increasing spring rate by an attendant increase in effective area. Of course, spring rate can also be influenced with the use of external volume reservoirs to increase volume and thereby reduce spring rate.

As a practical solution, spring rates for any particular automotive application are more easily and economically adjusted by varying the contour of the piston because of its direct effect on effective area. Increasing the cylindrical diameter of the sleeve per se to change volume and reduce spring rate becomes impractical because an increase in diameter increases the effective area which operates to further increase spring rate. Increasing the length of a sleeve to increase volume while maintaining effective area becomes impractical because it substantially affects the height of the airspring while also increasing its tendency to buckle. An example of a sleeve with a contoured piston that affects spring rate is shown in Canadian Pat. No. 1,125,319. An example of an airspring having a sleeve with increased length and a contoured piston is shown in U.S. Pat. No. 4,174,827.

In practice, the effects on spring rate caused by a piston entering and exiting an air chamber of a rolling lobe pneumatic spring, are routinely compromised by external means such as external volume reservoirs, pressure relief mechanisms, and pumps that affect pressure and volume; piston effects on spring rate are routinely compromised by internal means such as piston contour and secondairily, by sleeve length and sleeve diameter. An increase in length to increase volume has the disadvantage of increasing height and thereby decreasing buckling resistance, while an increase in diameter to increase volume has the disadvantage of increasing spring rate by increasing the effective area. The combined effects of length and diameter of an inflated cylindrical sleeve establish an optimum spring rate for a given space envelope and load. Consequently, contouring a piston has become substantially the only internal means for compromising piston effects on spring rate.

Sleeves for airsprings are usually of the elastomeric type that are reinforced with successive layers of fibrous members oriented at opposite helical angles with respect to the sleeve; the fibrous members may be in the form of helically disposed cords. An example of making a rolling lobe type sleeve is disclosed in U.S. Pat. No. 3,666,598 where uncured extruded elastomeric tubing is slipped over a thin walled mandrel forming a liner. Rubberized cord fabric, cut in the form of a parallelogram, is helically wound over the liner in one direction. A second layer of rubberized cord fabric is wound in the opposite direction over the first layerd cord fabric at substantially the same, but opposite, helical angle. A cover is applied over the cord and the assembly is cured.

The sleeve is reinforced with successive layers of embedded cords that are disposed at opposite helical angles of about 36 degrees. After the sleeve is attached to a piston and an end enclosure, it is pressurized which "pantographs" the successive layers of cord to usually a larger helical angle that approaches a locking helical angle of about 66 degrees; the increase in angle causes the sleeve to increase in diameter at the chamber portion of the sleeve.

In some methods of making a sleeve, a frustoconical mandrel is inserted into a portion of the sleeve and cured thereon so that the chamber portion of the sleeve has a larger diameter to facilitate attachment to an end closure member. The frustoconical mandrel has the effect of altering the helical angle of the cord while also changing the cord spacing; when inflated, such sleeves inflate to form substantially a cylindrical member.

SUMMARY OF THE INVENTION

In accordance with the invention, a sleeve, airspring and method are provided. The sleeve has a construction that can be used as an internal means to comprise the effects of spring rate associated with a piston entering and exiting an air chamber. Also, the effective spring rate of an airspring can be increased or reduced over that known for the inflated cylindrical type airspring. An airspring sleeve is provided which has a chamber portion interconnecting a rolling lobe portion. The sleeve is of the elastomeric type that is reinforced with successive layers of embedded cords wound at opposite helical angles. The sleeve has an annular band portion in one of the sleeve portions where the successive layers of cords are wound at inconstant helical angles.

The sleeve is used in an airspring where the band portion has an effect on the inflated diameter of the sleeve and its associated volume or effective area. When in the rolling lobe portion, the band affects effective area and spring rate.

Cords of successive layers are wound at inconstant helical angles in an annular band portion of one of the sleeve portions. Winding the cords at inconstant helical angles in the band portion establishes a winding length increase in the cords that defines means for contouring the band portion when the sleeve is inflated; such contouring affects inflated volume or effective area. Several different band portions may be used in a sleeve to control several portions of its inflated contour.

An object of the invention is to provide a sleeve design that compromises the spring rate effect of a piston entering a chamber. Another object of the invention is to increase the effective diameter of an airspring without substantially increasing its volume. Still another object of the invention is to provide a method of controlling spring rate by means of a sleeve reinforcement member. Yet another object of the invention is to provide an airspring having a spring rate that is less than that of a prior art device similarly sized for spring rate and load.

An advantage of the invention is that it provides an airspring design of smaller envelope size than prior art devices. Another advantage of the invention is that the airspring provided can be designed to provided a lower spring rate than previously known prior art devices. Still another advantage of the invention is that an airspring is provided which has less reliance on piston shape to compromise spring rate effects caused by a piston entering a chamber.

These and other objects or advantages of the invention will be apparent after reviewing the drawings and description thereof wherein:

DESCRIPTION OF PREFERRED EMBODIMENTS

Figure 1:
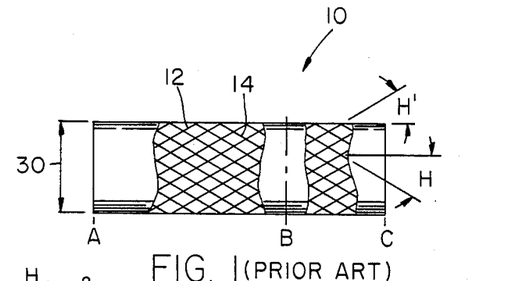
FIG. 1 is a partially cut away side view of a prior art sleeve for an airspring schematically showing a helical orientation of embedded cords in two successive cord layers where cords in one layer are disposed at a helical angle that is opposite the helical angle of the cords in the successive cord layer.
Figure 2:
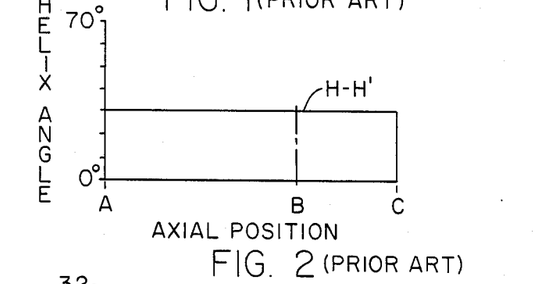
FIG. 2 is a chart showing the helical angle of successive layers of cord fabric as embedded throughout the length of the prior art sleeve of FIG. 1.
Figure 3:
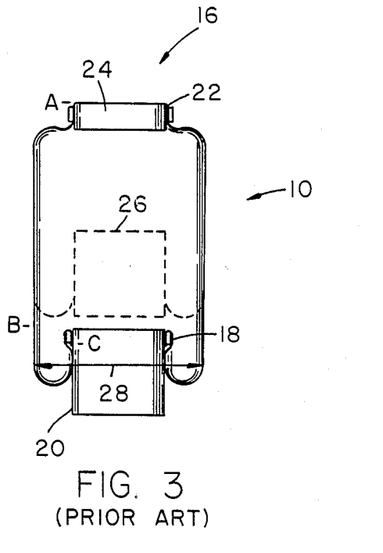
FIG. 3 is an axial cross section of an airspring of the rolling lobe type utilizing the prior art sleeve of FIG. 1.

FIGS. 1–3 illustrate some characteristics of a prior art sleeve and airspring for comparing to characteristics of the present invention. In FIG. 1, a conventional prior art sleeve 10 of the cylindrical type is shown.

The sleeve is of the elastomeric type that is reinforced with successive layers 12, 14 of embedded cords, where cords of one layer 12 are disposed at a helical angle H that is opposite, the helical angle H' of the cords of the successive layer 14. portion A-B interconnecting a rolling lobe portion B-C. FIG. 2 illustrates the opposite helical angles that are used relative to axial position for the successive layers of cord. A helical angle H, H' of about 30 degrees is shown for each of the successive cord layers (for the purpose of this disclosure, there are no plus of minus signs used to show the opposite helical angles); however, it is known in the art that a helical angle in a range of about 30 to about 55 degrees may be used throughout the sleeve for both the chamber portion A-B, and the rolling lobe portion B-C.

When used in an airspring 16 such as that disclosed in FIG. 3, the rolling lobe portion B-C of the sleeve 10 is inverted and connected at an end 18 to a piston 20 and the chamber portion A-B is connected at an end 22 to a closure member 24. The dotted line 26 illustrates how the piston and rolling lobe portion moves into the chamber portion when the airspring is pressurized. Pressurization causes the helical angle of the cords to change (not shown) and approach what is known as the "locking angle" which is about 66 degrees. As the cords change angle, they also change position or "pantograph" relative to each other permitting the sleeve to expand to a substantially cylindrical shape having a diameter 28 that is greater than the original diameter 30. In some prior art sleeves, an end portion of a sleeve is slid over a frustoconical mandrel (not shown) so that the end portion is more easily attachable to a closure member; however, such sleeves also inflate to substantially a cylindrical shape owing to the helical orientation and circumferential spacing of the cords.

Figure 4:
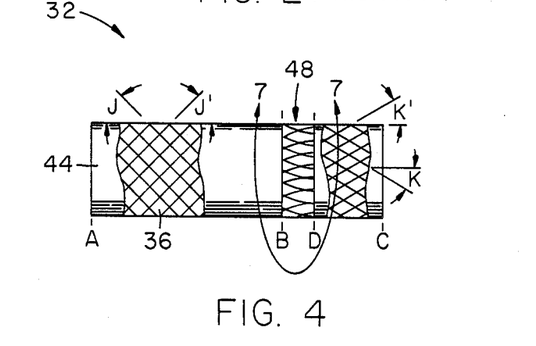
FIG. 4 is a side view similar to FIG. 1 schematically showing two successive cord layers, but also showing a sleeve of the invention.
Figure 5:
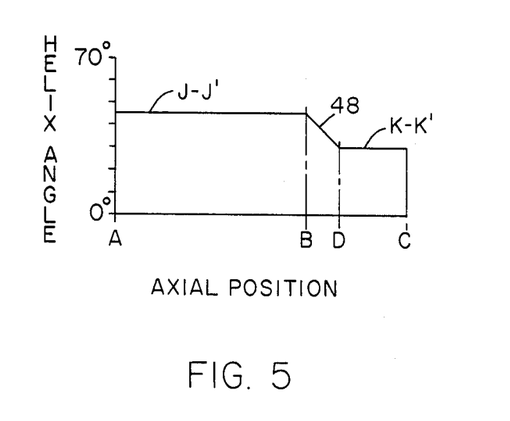
FIG. 5 is a view similar to FIG. 2 but showing the helical angle of successive layers of cords as embedded throughout the length of the sleeve of FIG. 4.

Referring to FIGS. 4–7, a sleeve 32 is provided for use on an airspring 34 of the invention. The sleeve 32 is of the elastomeric type that may be compounded with any suitable elastomer such as rubber, synthetic rubber, or blends thereof, urethanes, or the like. The sleeve is reinforced with an embedded fibrous member such as cords 36 where successive layers 38, 40 of cord are wound at opposite helical angles J—J', K—K'. The fibrous member or cords may be of any suitable type such as made with synthetic fibers of nylon, rayon, polyester, fiberglass and aramid, or the cord may be made of natural fibers such as cotton or the like. The elastomeric portion of the sleeve forms a liner 42, a cover 44, and optionally, a layering 46 between successive layers of cord. The sleeve has a chamber portion A-B interconnecting a rolling lobe portion B-C. Throughout this disclosure, the letters A-B are used to designate a chamber portion and the letters B-C are used to designate a rolling lobe portion to facilitate an easy comparison of such portions in the various examples. Cords of successive layers 38, 40 are wound at inconstant helical angles 48 in at least one annular band portion B-D of either the rolling lobe portion B-C as shown juxtaposed the chamber portion or in the chamber portion per se. The angles are inconstant and vary from first opposite helical angles J—J' to second opposite helical angles K—K'. As particularly illustrated in FIG. 7, the change in helical angles in the band portion puts a "partial loop" 50 in the cords with an attendant increase in length over that of a cord wound at a constant helical angle. As illustrated in FIG. 4, the helical angle J—J' changes from about 45 degrees in the chamber portion to a helical angle K—K of about 30 degrees in the rolling lobe portion. The axial length of the band portion where the inconstant helical angles occur is preferably about 0.5 in, and more preferably is at least about 1 inch; but the axial length may vary over the entire rolling lobe portion, the entire chamber portion or both. Preferably, the helical angles in the rolling lobe portion are less than that of the 66 degree locking angle of a sleeve when pressurized. For example, the helical angles may preferably range from about 30 to about 62 degrees in the rolling lobe portion and more preferably from about 35 degrees to about 55 degrees; and most preferably, from about 38 degrees to about 55 degrees. In the chamber portion, the helical angles may preferably range from about 10 to about 89 degrees, more preferably from about 20 to about 70 degrees and most preferably from about 30 to about 60 degrees.

Figure 6:
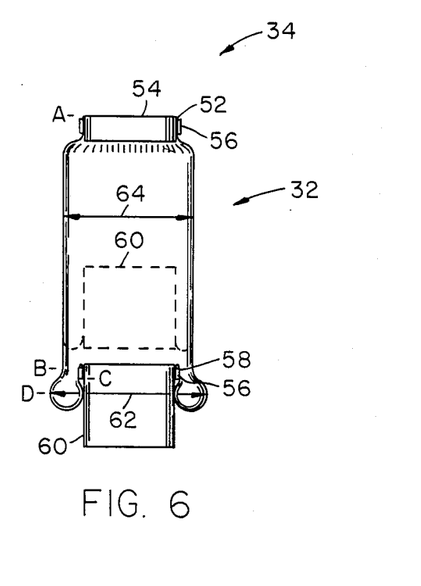
FIG. 6 is a view similar to FIG. 3 but showing a cross section of an airspring using the sleeve of FIG. 4.
Figure 7:
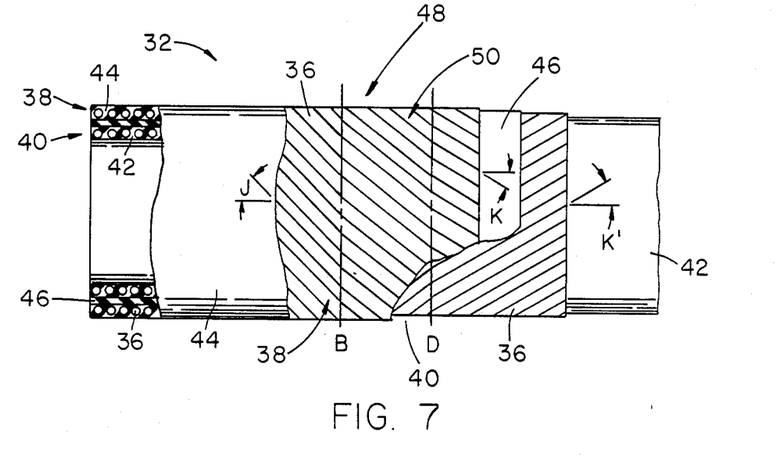
FIG. 7 is an enlarged and partially cutaway view taken generally along the line 7—7 of FIG. 4 and showing successive layers of embedded cord wound at constant and inconstant helical angles.

When the sleeve 32 is assembled as a component part of the airspring 34 as particularily illustrated in FIG. 6, an end 52 of the chamber portion is connected to a closure member 54 with attachment means such as a band 56, and the rolling lobe portion is inverted and connected at an end 58 by attachment means such as a band 56, to a piston 60. The piston primarily reciprocates in the chamber portion as illustrated by the dotted line. The piston is shown to have a cylindrical contour but it may also include upright or inverted frustoconical sections as known in the art to further affect spring rate.

The airspring is inflated causing the cords to change their helical angle and approach the locking angle. The "partial loop" 50 in the cords of the band portion B-D substantially "straighten out" and also pantograph as they approach a locking angle. The position change of the cords in the band portion makes a transitionary section between a larger inflated diameter 62 of the rolling lobe and a smaller inflated diameter 64 of the chamber portion. The rolling lobe portion with its cord wound at a smaller helical angle (i.e. 30 degrees) that is less than the locking angle (i.e. 66 degrees), inflates to a larger diameter than the chamber portion where the cords are at a larger helical angle (i.e. 45 degrees) that is also less than the locking angle. The maximum diameter 62 of the rolling lobe corresponds to the maximum effective area diameter of the pressurized airspring. When the piston 60 enters the chamber as shown by the dotted line, the larger diameter portion associated with part D-C of the rolling lobe inverts and rolls against the piston and thereby subtracts its increased diameter and area; the result is that spring rate is reduced from the effect of the piston entering the chamber. Accordingly, the annular band with its inconstant helical angle defines a means for decreasing the effective spring rate of the airspring.

Figure 8:
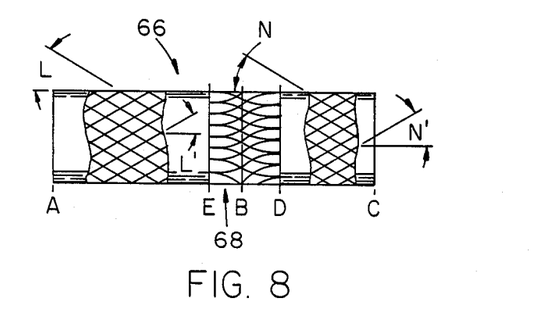
FIG. 8 is a schematical side view similar to FIG. 4 but showing an alternate form of a sleeve of the invention.
Figure 9:
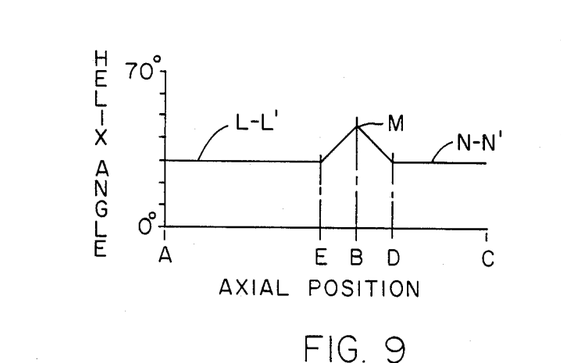
FIG. 9 is a view similar to FIG. 5 but showing the helical angle change of the sleeve of FIG. 8.
Figure 10:
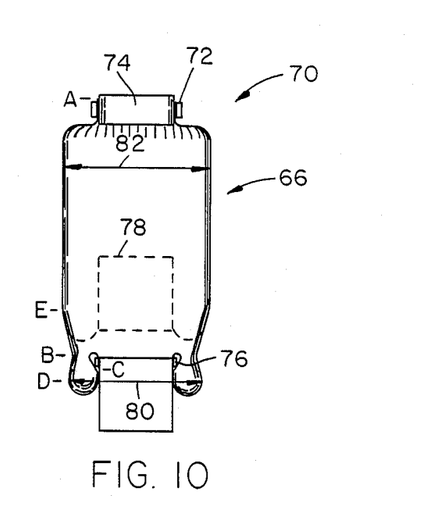
FIG. 10 is a view similar to FIG. 6 but showing the sleeve of FIG. 9 as part of an airspring.

One or more bands with cords at inconstant helical angles may be wound in a sleeve for the purpose of controlling the inflated contour of the airspring. In the foregoing example (FIGS. 4–7), a cylindrical sleeve is constructed in accordance with the invention to have a noncylindrical inflated contour to increase effective area. Referring to FIGS. 8–10, a sleeve 66 similar to that for FIG. 4 is provided except that a second annular band portion E-B with inconstant helical angles 68 is located in the chamber portion A-B juxtaposed the rolling lobe portion of the first band portions B-D. As illustrated in FIG. 9, the helical angle of the cords of successive layers are wound from a first angle L—L' of about 30 degrees to a second angle M of about 45 degrees and back to a third angle N—N' of about 30 degrees. Like in the previous example, the helical angles may be as desired but usually are chosen to be less than the locking angle of 66 degrees. When assembled in an airspring 70 such as in the manner previously described, one end 72 of the chamber portion is attached to a closure member 74 and the rolling lobe portion of the sleeve is inverted and attached at an end 76 to a piston member 78. When the airspring is inflated, the first band portion B-D, with its inconstant helical angles, control an inflated portion of the rolling lobe to an increased diameter 80 and thereby cause an increase in effective area; the second band B-E of inconstant helical angles or angle gradient makes a transitionary change to an increased diameter 82 of the chamber portion which increases airspring volume. The effect is to lower the overall height of the airspring without increasing its spring rate.

To partially illustrate the effectiveness of the sleeve and airspring of the invention, two airsprings were built having the construction substantially in accordance with FIGS. 6 and 10 for comparison with a similarly sized prior art airspring constructed to support a nominal load of approximately 1200 pounds. The following table illustrates the reduced spring rate and height associated with the teachings of the inventions:

| Variable (at Design Height) | FIG. 3 Prior Art | FIG. 6 | FIG. 10 |
| --- | --- | --- | --- |
| Design Height (in) | 9.50 | 9.25 | 7.50 |
| Load (lbs) | 1150 | 1150 | 1150 |
| Pressure (psi) | 73 | 73 | 73 |

| Variable (at Design Height) | FIG. 3 Prior Art | FIG. 6 | FIG. 10 |
|---|---|---|---|
| Rolling Lobe Diameter (in) | 5.7 | 5.7 | 5.7 |
| Piston Diameter (in) | 3.9 | 3.9 | 3.9 |
| Piston Type | Straight | Straight | Straight |
| Volume (in³) | 105 | 105 | 105 |
| Spring Rate (lb/in) | 294 | 220 | 220 |

Figure 11:
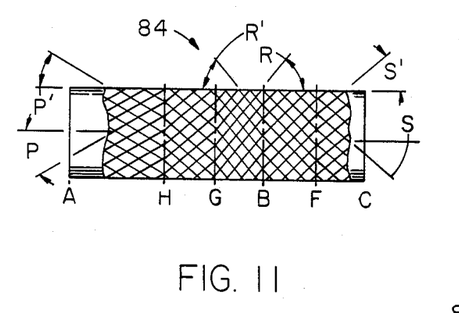
FIG. 11 is a schematical view similar to FIG. 4 but showing an alternate form of a sleeve of the invention.
Figure 12:
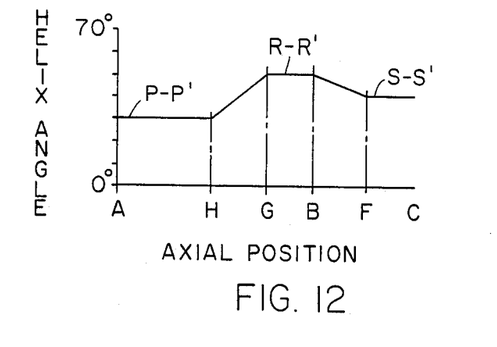
FIG. 12 is a view similar to FIG. 5 but showing the helical angle change of the sleeve of FIG. 11.
Figure 13:
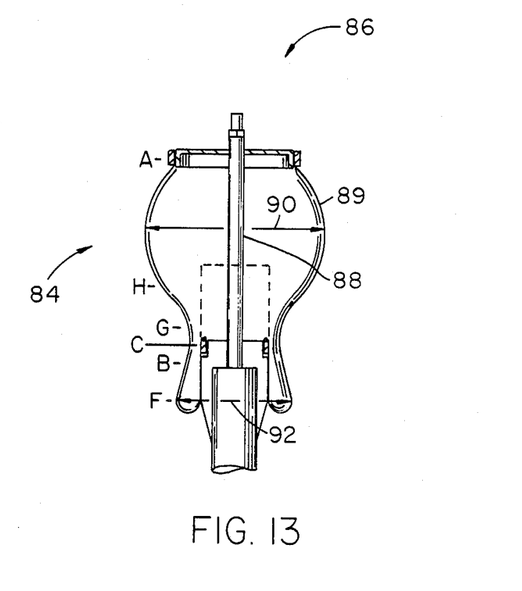
FIG. 13 is a view similar to FIG. 6 but showing the sleeve of FIG. 12 as part of an airspring.

FIGS. 11 through 13 are illustrative of another embodiment of the invention where a sleeve 84 made in a manner similar to that as previously described is shown. However, the sleeve 84 has band portions H-G, B-F with inconstant helical angles and one portion 6B with constant helical angle R—R' that control the inflated contour of the air sleeve. The inconstant helical angles are varied through transients in accordance with FIG. 12 from first angles P—P', to second angles R—R', to third angles S—S'. The sleeve is assembled into an airspring 86 in a manner as previously described except that the airspring also has a center strut 88 such as may be used in some types of suspension members. When inflated, the airspring has a toroidal portion 89 with an increased diameter 90 causing an attendant increase in volume and a band B-F portion in the rolling lobe portion which controls and increases the effective diameter 92, and consequently the effective area, at the nominal height position.

Figure 14:
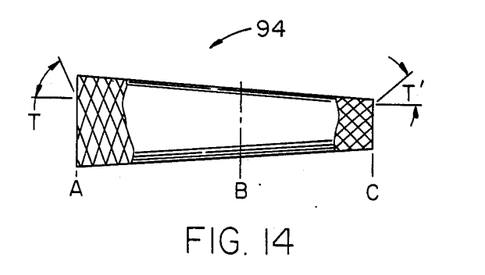
FIG. 14 is a schematical view similar to FIG. 4 but showing an alternate form of a sleeve of the invention.
Figure 15:
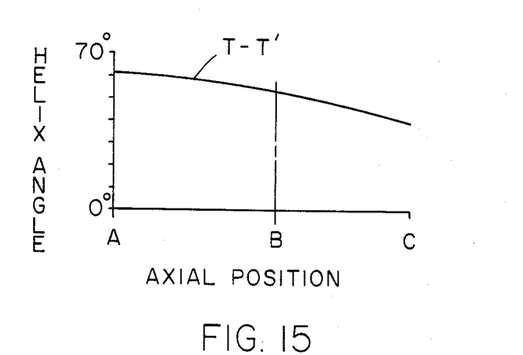
FIG. 15 is a view similar to FIG. 5 but showing the helical angle change of the sleeve of FIG. 14.
Figure 16:
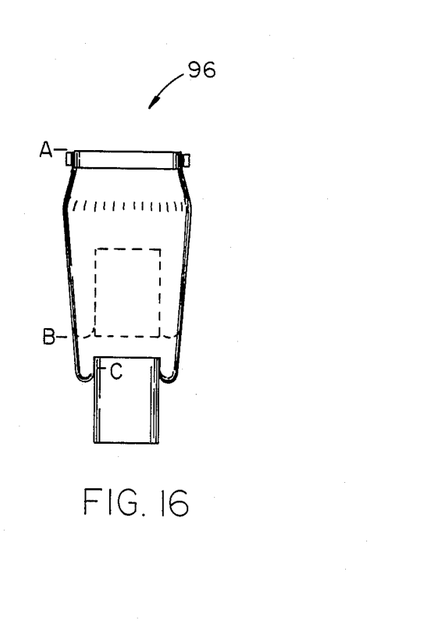
FIG. 16 is a view similar to FIG. 6 but showing the sleeve of FIG. 14 as part of an airspring.

The previous teachings of the invention are associated with building a sleeve having an inflated cylindrical diameter and a contoured inflated diameter. Teachings of the invention of using inconstant helical angles may also be used when forming any sleeve having an uninflated shape such as being frustoconical. Referring to FIGS. 14-16, another embodiment of the invention is shown. A sleeve 94 is provided where the sleeve is made with an elastomeric material and has embedded successive layers of cord wound at helical angles T—T' in accordance with FIG. 12 so that the band A-C is located substantially throughout the chamber and rolling lobe portions of the sleeve. The cord is wound at predetermined inconstant helical angles in the band portion such that when the sleeve is assembled into an airspring 96 such as shown in FIG. 16 and inflated, it substantially remains in a frustoconical shape. If the inconstant helical angles in the band were not controlled, it would inflate to a cylindrical shape at a locking angle of about 66 degrees.

METHOD

Figure 17:
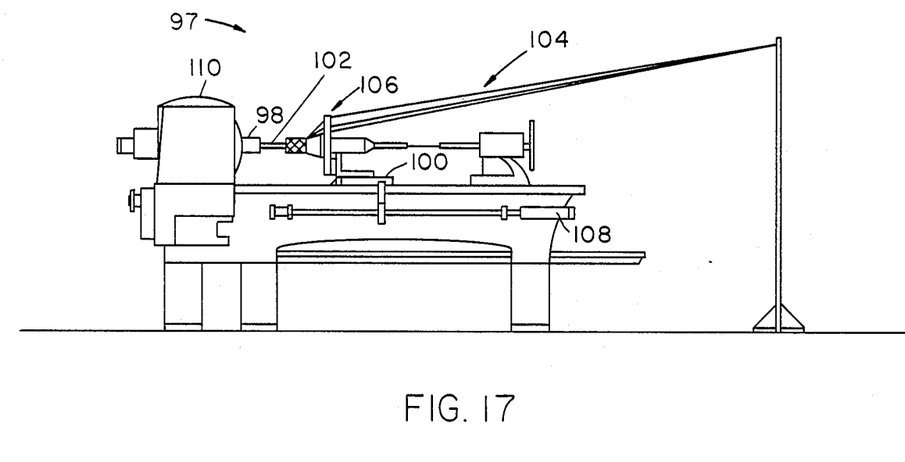
FIG. 17 is a schematical side view of a lathe showing how successive cord layers may be wound at inconstant helical angles in accordance with a method of the invention.

Sleeves of the invention may be made on a lathe 97 such as is illustrated in FIG. 17 having a spindle 98 and carriage 100 that may be varied in speed with respect to each other. A mandrel 102 is chucked in the lathe and successive layers of a sleeve are applied thereto. Layers of elastomeric material may be applied in known fashion such as by extruding, spiraling, lapping or the like. The purpose of FIG. 17 is to show a methodolgy of how successive layers of cord 104 may be wound at inconstant helical angles utilizing a cord let-off ring 106. Rotation of the lathe and movement of the carriage are reversed for successive cord layers. For a constant helical angle built on a constant diameter mandrel, the mandrel rotational velocity and carriage velocity remain at a fixed constant such as is used in standard lathe equipment. However, if the helix angle is to be varied along the sleeve axis with respect to the mandrel, a new velocity relationship is required. For increases in helix angle, the ratio of carriage velocity to mandrel velocity is decreased. For decreases in helix angle, rotation of carriage velocity to mandrel velocity is increased. To continually vary a helix angle from some initial value to some final value over a given distance along the mandrel axis, carriage velocity and mandrel velocity must be constantly controlled such as by means such as computers (not shown) and stepper motors 108, 110.

Figure 18:
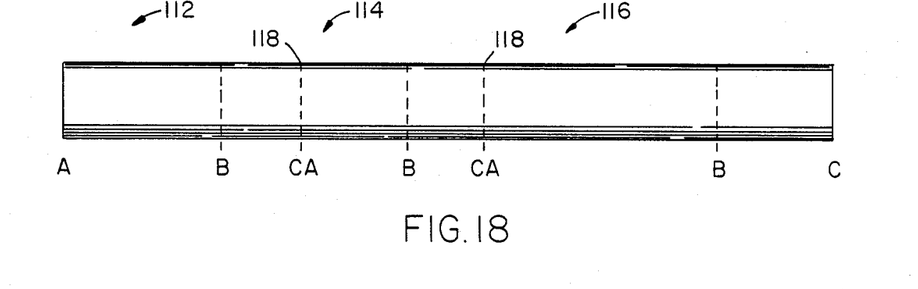
FIG. 18 is a side view of successive sleeves built end-to-end such as with the lathe of FIG. 17.
Figure 19:
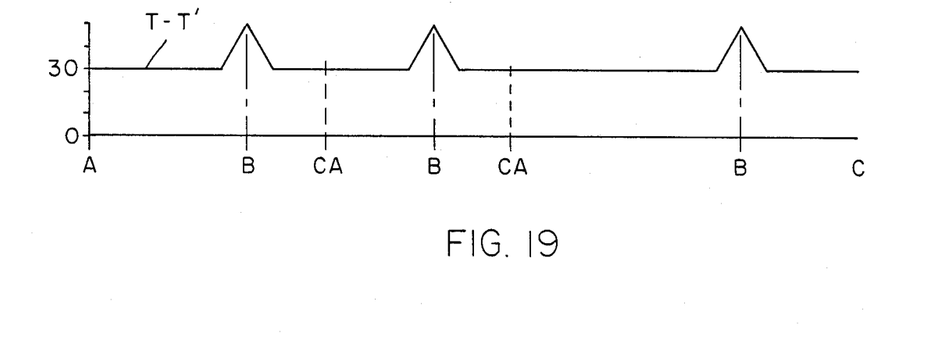
FIG. 19 is a view similar to FIG. 5 but showing the helical angle of successive layers of cords as embedded throughout the sleeves of FIG. 18.

Referring to FIG. 18, successive sleeves 114, 116 are built end-to-end on a single mandrel with the lathe. As an example, a series of sleeves are built with the configuration as illustrated with regard to FIG. 9 and in accordance with the helical angle variation T—T' illustrated by FIG. 19. Once built and thereafter cured in known fashion such as for example as those used to cure lengths of hose, successive sleeves 112, 114, 116 are cut 118 therefrom.

Figure 20:
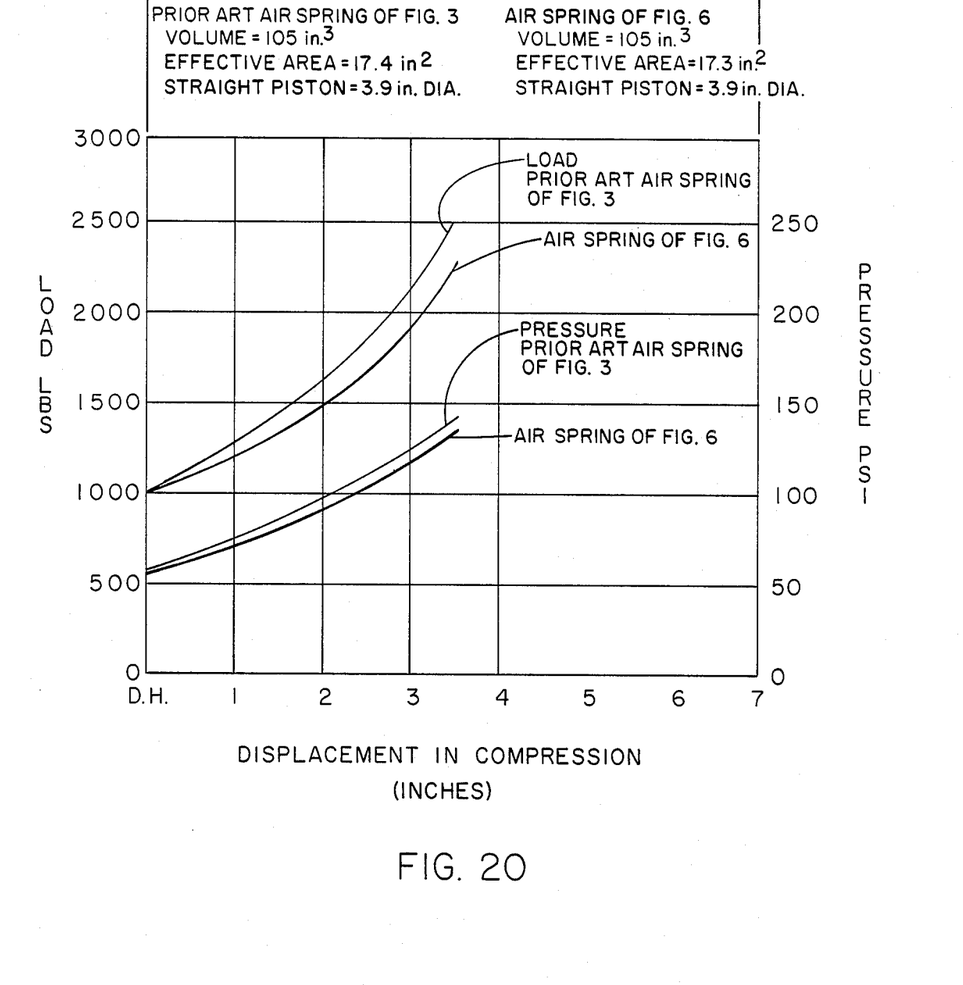
FIG. 20 is a chart showing comparative load and pressures for airsprings built in accordance with FIG. 3 and FIG. 6.

To further illustrate the effectivness of sleeves and airsprings of the invention, FIG. 20 shows airspring load versus deflection and pressure versas deflection curves for sleeves of FIG. 3 and FIG. 6. As shown, the airspring of the invention has lower load and pressure change for a given deflection and consequently, a lower spring rate than the prior art airspring. Thus, the sleeve with its band portion of inconstant helical angles is used as an internal means for controlling spring rate to compromise the effects of a piston entering and exiting a chamber. Heretofore, sleeves were not used as an internal means to effectively control or substantially modify spring rate; contoured pistons were used.

The foregoing detailed description is used for purpose of illustration only and is not intended to limit the scope of the invention which is to be determined from the appended claims.

What is claimed is:

1. In an airspring of the type with a sleeve having (1) a chamber portion connected at an end to a closure member and (2) a rolling lobe portion connected at an end to a piston, the sleeve of the elastomeric type reinforced with successive layers of embedded cords disposed at opposite helical angles, the improvement comprising:
cords in each of the successive layers wound at inconstant helical angles in an annular band portion of one of the sleeve portions from first opposite helical angles to second opposite helical angles.

2. The airspring as claimed in claim 1 wherein the band portion defines a means for establishing an inflated contour of the sleeve.

3. The airspring as claimed in claim 1 wherein the band portion is in the rolling lobe portion.

4. The airspring as claimed in claim 1 wherein the band portion is in the chamber portion.

5. The airspring as claimed in claim 1 and further including a strut member extending from the end closure member and slidably through a center portion of the piston.

6. In an airspring of the type with with a sleeve having (1) a chamber portion connected to an end to an closure member and (2) a rolling lobe portion connected at an end end to a piston, the sleeve of the elastomeric type reinforced with embedded fibrous members, the improvement comprising:
means for contouring a band portion of the rolling lobe portion to an effective diameter that decreases as part of the rolling lobe portion is rolled into the chamber portion by means of the piston to thereby decrease the effective spring rate of the airspring wherein the contouring means comprises an embedded fibrous reinforcement of successive layers of cord wound at opposite helical angles in successive layers, the cords wound at inconstant helical angles in an annular band portion of the rolling lobe portion from first opposite helical angles to second opposite helical angles.

7. The airspring as claimed in claim 6 wherein the cords in the rolling lobe portion are at constant and first opposite helical angles in a range from about 30 to about 45 degrees and at a second larger angle from about 40 to about 55 degrees.

8. In an airspring of the type with a sleeve having (1) a chamber portion connected at an end to a closure member and (2) a rolling lobe portion connected at an end to a piston, the sleeve of the elastomeric type reinforced with embedded fibrous members, the improvement comprising:

means for contouring a band portion of the sleeve to increase an inflated volume of the chamber portion wherein the contouring means comprises an embedded fibrous reinforcement of successive layers of cords wound at opposite helical angles in successive layers, the cords would at inconstant helical angles in an annular band portion of the chamber portion from first opposite helical angles to second opposite helical angles.

9. The airspring as claimed in claim 8 wherein the cords of the chamber portion are from a first opposite helical angle in a range from about 40 to 55 degrees to lesser second helical angle in a range from about 45 to 30 degrees.

10. In an airspring sleeve having a chamber portion interconnecting a rolling lobe portion and of the elastomeric type reinforced with successive layers of embedded cords wound at opposite helical angles, the improvement comprising:

cords of successive layers wound at inconstant helical angles in an annular band portion of one of the sleeve portions from first opposite helical angles to second opposite helical angles.

11. The airspring sleeve as claimed in claim 10 wherein the band portion defines a means for establishing an inflated contour of the sleeve.

12. The airspring sleeve as claimed in claim 10 wherein the band portion is in the chamber portion of the sleeve.

13. The airspring sleeve as claimed in claim 10 wherein the band portion is in the rolling lobe portion.

14. The airspring sleeve as claimed in claim 13 wherein the band portion is in the rolling lobe portion and juxtaposed the chamber portion.

15. The airspring sleeve as claimed in claim 10 wherein the band portion has a width measured axially of the sleeve that is at least about 0.5 in.

16. The airspring sleeve as claimed in claim 10 wherein the sleeve is substantially cylindrical.

17. The airspring sleeve as claimed in claim 10 wherein the sleeve is substantially frustoconical.

18. The airspring sleeve as claimed in claim 10 wherein the absolute difference between the first and second opposite helical angles is at least about five degrees.

19. The airspring sleeve as claimed in claim 10 wherein the inconstant helical angles of the band are substantially in the rolling lobe portion and are followed by a second and opposite inconstant helical angles in a second annular band portion substantially in the chamber portion, the opposite helical angles of the second band portion from the second opposite helical angles to third opposite helical angles.

20. The airspring sleeve as claimed in claim 19 wherein the first opposite helical angle is from about 30 to about 45 degrees, the second opposite helical angle is from about 40 to 55 degrees, and the third opposite helical angle is from about 30 to about 45 degrees.

21. In an airspring sleeve having a chamber portion interconnecting a rolling lobe portion and of the elastomeric type reinforced with successive layers of embedded cords wound at opposite helical angles, the improvement comprising:

cords and each of the successive layers wound at a first helical angle in the chamber portion and at a second, unequal angle in the rolling lobe portion.

22. The airspring sleeve as claimed in claim 21 wherein the angle in the chamber portion is greater than the angle in the rolling lobe portion.

23. The airspring sleeve as claimed in claim 22 wherein the first helical angle is in a range from about 10 to about 89 degrees and the second helical angle is in a range from about 30 to about 62 degrees.

24. The airspring sleeve as claimed in claim 21 wherein the first helical angle is in a range from about 20 to about 70 degrees and the second helical angle is in a range from about 35 to about 55 degrees.

25. The airspring sleeve as claimed in claim 21 wherein the first helical angle is in a range from about 30 to about 60 degrees and the second helical angle is in a range from about 38 to about 55 degrees.

* * * * *